Aug. 12, 1958  G. W. WEBSTER ET AL  2,846,746
PARACHUTE HARNESS LINK
Filed March 5, 1956  2 Sheets-Sheet 2

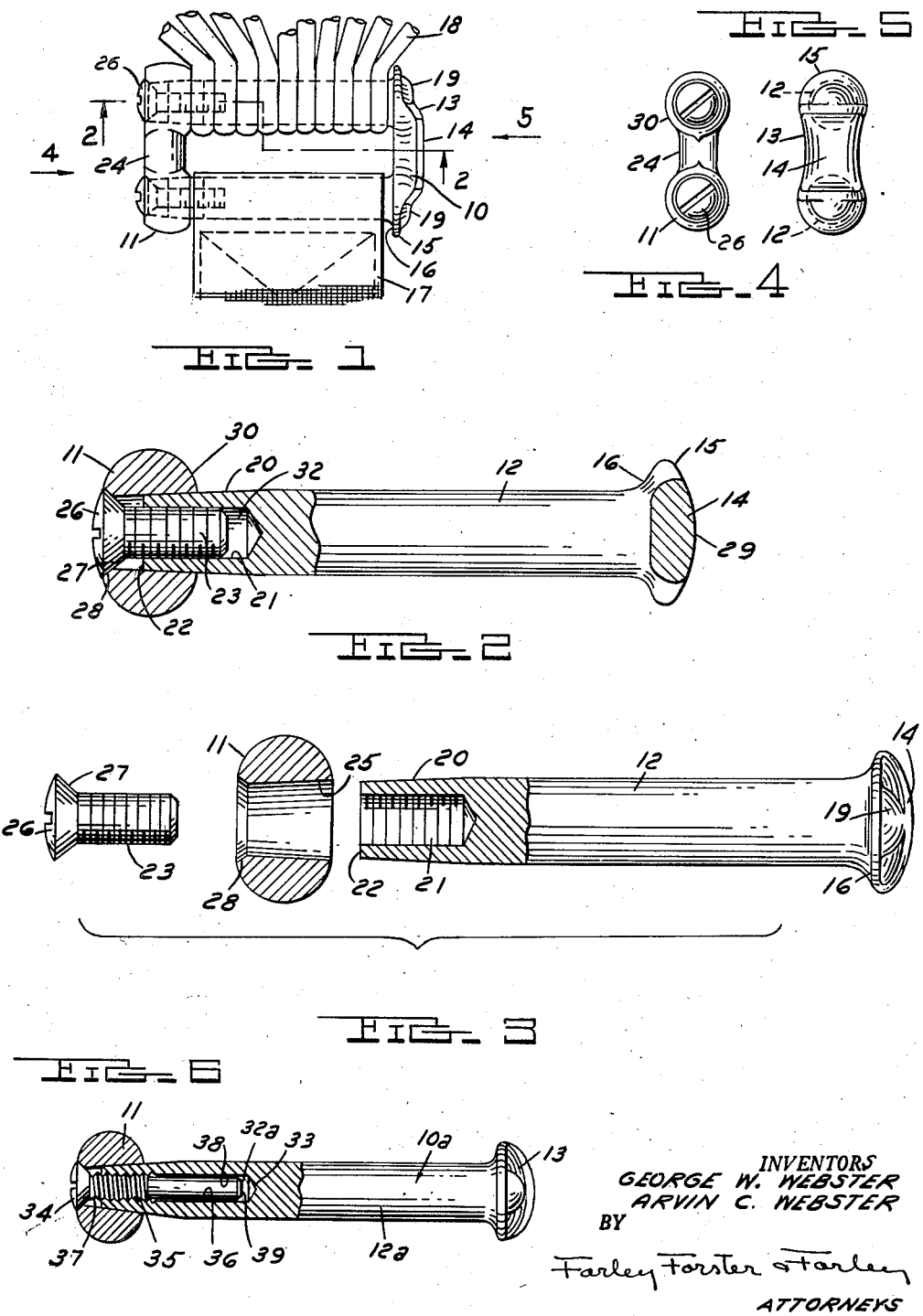

INVENTORS
GEORGE W. WEBSTER
ARVIN C. WEBSTER
BY
Farley, Forster + Farley
ATTORNEYS United States Patent Office 2,846,746
Patented Aug. 12, 1958

2,846,746

PARACHUTE HARNESS LINK

George W. Webster and Arvin C. Webster, Birmingham, Mich.

Application March 5, 1956, Serial No. 569,356

4 Claims. (Cl. 24—265)

This application is a continuation-in-part of our co-pending application, Serial No. 284,522, filed April 26, 1952, now abandoned, and relates to improvements in the construction of a link particularly useful for interconnecting component parts of a parachute assembly such as the ends of two web members of the harness or the ends of a group of shrouds to one web member of the harness.

Large numbers of such links are employed to interconnect the harness members and to connect the harness risers to the shrouds of both personnel and cargo-carrying parachutes, and for a number of years a need has existed for a harness link of a take-apart or two-piece type, as distinguished from a one-piece link, so that parachute harness and shroud members could be connected or disconnected without the necessity of forming or removing the loop provided at the ends of these members for engagement with the link.

To our knowledge, the only type of take-apart link construction designed to fulfill this need is disclosed in United States Patent No. 2,447,921, issued August 24, 1948 and consists of a rectangular-shaped link assembly composed of two L-shaped elements which are interconnected at diagonally opposite corners of the rectangle. Besides being expensive, this construction possesses certain other disadvantages in that it is weak in resisting a force applied by a slipped shroud to one end of the rectangle, the parts are difficult to assemble, the link is undesirably heavy for a given strength, and cannot be cheaply manufactured in quantity with the parts shaped in such a way that positive provision is included for maintaining the link in proper assembled relationship with the interconnected parachute members.

It has been our experience that a definite need has existed for a simple take-apart link construction which meets the relatively high strength and dependability requirements for parachute harness use. The strength of the link should be substantially the same regardless of the direction of the forces upon it. Yet, at the same time, the link construction to be acceptable must be inexpensive. These links are frequently lost in service and are considered as expendible property.

Our invention meets all of these requirements by providing a take-apart link having a pair of substantially parallel shanks adapted to engage the looped ends of two parachute harness members. The shanks are connected at each end in spaced parallel relation by an end piece, at least one of which is detachable from the shanks. Such detachable end piece is provided with a pair of bores or sockets each dimensioned to receive and engage a portion of one end of each of the shanks, these shank end portions each having an internally threaded, longitudinally extending hole. Connection is established by a pair of headed screws each of which extends through the detachable end piece into engagement with one of the threaded holes to draw the shank end portions into firm engagement with the bores or sockets of the end piece. In one construction of our invention the pair of shanks and one end piece are integrally formed as a U-shaped link body with the end piece portion thereof having an integrally formed shoulder extending around the circumference of each shank to positively position a harness member thereon.

The shank end portions which are connected to the detachable end piece and the bores formed therein can be made with complementary tapers in order to provide a firm, wedged engagement and also to facilitate the threading of the looped end of a harness member onto a shank of the link.

In another form of construction, the bores provided in the detachable end piece extend only part way therethrough to form a socket which receives a shank end portion.

The link of the invention can also be satisfactorily made with both end pieces detachable. In this case, the link consists of a pair of identical shanks and a pair of identical end pieces.

These constructional features of the invention are illustrated in the constructions shown in the accompanying drawings which includes the following views.

Fig. 1 is a plan view of the link with parts thereof in assembled relationship and showing the association of the link with the shroud lines of a parachute and a web riser member of the harness;

Fig. 2 is a sectional elevation of the link of Fig. 1 taken along the line 2—2 thereof;

Fig. 3 is a view similar to Fig. 2 showing the parts in exploded relationship;

Fig. 4 is an end elevation of the structure of Fig. 1 showing the shape of the end piece of the link;

Fig. 5 is an end elevation of the opposite end of the link showing the shape of the end of the link member;

Fig. 6 is a fragmentary plan view, partly in section, showing the parts of the link assembled by an alternate construction;

Figure 7:
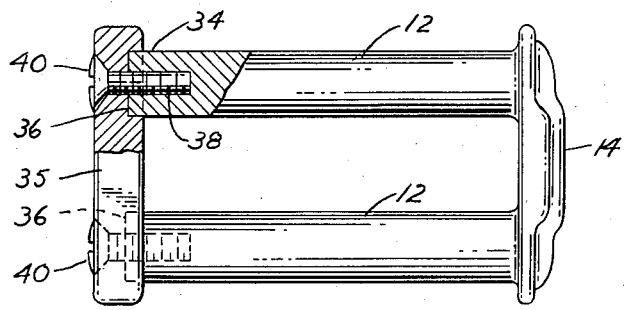
Fig. 7 is a plan view of an alternate link construction with portions thereof shown partly in section.

The link construction illustrated in Figs. 1 to 5 comprises a U-shaped member 10, the open ends of which are connected by a detachable end piece 11. The U-shaped member 10 is formed with a pair of identical parallel shanks 12 of circular cross section which are formed in one piece with an end web 13. Referring to Fig. 5, this web 13 has a central portion 14 of reduced width but thickened cross section as shown in the sectional view of Figs. 2 and 3. The configuration of this end web 13 is such as to give maximum strength to the U-shaped member 10 when formed by a forging operation, and yet provide a projecting flange 15 which surrounds the end of each shank 12 to form a shoulder 16 which prevents a parachute harness member such as the riser strap 17 or shroud lines 18 from slipping off the shank portion 12 of the link and onto the end web 13 thereof. In cross sectional area, the end web 13 is thicker at all portions along its longitudinal center line, this thickened cross section including a thickened central shoulder portion 19, adjacent each end of the section, which smoothly flares into the projecting flange 15. The formation of this shoulder 19 provides material for the formation of the flange 15 with the retention of sufficient material adjacent to the ends of the shanks 12 to prevent the inducement of high unit stresses in the area where the web portion 13 merges with the shanks 12.

The outer end of each shank 12 is provided with a wedge tapered section 20 and a hole 21 is formed in the outer face 22 of this shank, this hole being threaded to receive a screw 23.

The separable end piece 11, shown in end elevation in Fig. 4, has a central portion 24 of reduced circular cross section connecting enlarged ends each of which is provided with a tapered bore 25 for engagement with the tapered section 20 of each shank 12. The screw 23 illustrated is of the oval head type having a rounded outer face 26 and a tapered shoulder 27. A correspondingly tapered internal shoulder 28 is formed in each of the bores 25 of the end piece to provide an internal mating surface between the screw 23 and the end piece so that the head of the screw will lie substantially flush with the surrounding surface of the end piece when the parts are in assembled relationship.

When employing the link for the interconnection of parachute elements, such as shown in Fig. 1, the operation of assembly is facilitated first by the construction of the U-shaped member 10. The outer face 29 of the end of this section can be braced against any convenient support and the loop provided in the ends of either the riser member 17 or each of the shroud lines 18 can be slipped over the shank 12 to which they are to be secured.

In this assembly operation the shanks 12 of the U-shaped member 10 perform the function of a threading needle or marline spike. Their tapered portions 20 form a lead for the insertion of the shank within the loop of the riser member or shroud and their outer surface is entirely smooth and free of projections.

Once the riser member 17 and shrouds 18 have been assembled upon the shanks of the U-shaped member 10, the assembly of the link is completed by placing the end piece 11 over the tapered sections 20 of the shanks and securing it in position with the screws 23. The fastening action of the screws is augmented by a wedging action secured along the mating faces of the tapered bores 25 of the end piece and the tapered sections 20 of the shank 12, and, when the screws are properly drawn up, the strength of the assembled link is comparable to the strength that would be obtained were the link of integral rather than take-apart construction. Proper assembly of the parts to secure this strength is very easy. No problem exists of aligning the end piece 11 for proper engagement with the shanks 12 of the U-shaped member 10, and the operation of inserting and tightening the fastening screws 23 is very simple because of their adjacent relationship.

When the parts are assembled the shanks 12 have their cylindrical portion bounded at each end by the portions 30 on the end piece 11 and 15 on the end section of the U-shaped member both of which portions are of sharply defined, greatly increased cross sectional area so that the harness member or shroud are positively prevented from slipping to an improper position.

Under service conditions, the load transmitted through the link, as from the shrouds 18 to the riser 17 connected thereto, produce increased unit stresses toward the ends of the shank portion 12 of the U-shaped member 10, and under tests which load the link to the point of destruction under simulated service conditions, failure of the link almost always occurs in that portion 32 (see Fig. 2) of the shank which lies between the end of the screw 23 and the bottom of the hole 21. This is naturally due to the decreased amount of material available in this area 32 to resist these loads. We have found that the resistance of the link to this type of failure can be materially increased by employing the modified type of construction shown in Fig. 6. The modification illustrated affects the construction of the U-shaped member 10a, the end piece 11 being in the same form as previously described herein. Preferably, the construction of the U-shaped member 10a is also similar in all respects to that described previously except that the shanks 12a thereof are each drilled along their longitudinal center line so that the bottom 33 of the hole so formed lies approximately midway between the end web 13 of the U-shaped member 10a and the end piece 11. The initial portion 35 of this hole is threaded, while the inner portion 36 thereof is left with a plain cylindrical surface. A similar form is imparted to the fastening screw 34, this elements having a threaded portion 37 extending from the head end thereof and having its remaining portion 38 ground to form a cylindrical plug to extend within the cylindrical surface 36 of the hole, and being dimensioned so that the end 39 of the screw lies closely adjacent to the bottom 33 of the hole when the parts are in assembled condition.

The result of this construction is to locate the portion 32a of the shank 12a which lies between the bottom 39 of the screw 34 and the bottom 33 of the hole toward the mid-point of the shank and away from the area of higher unit stresses. At all other portions of the shank 12a between this area 32a and the end piece 11, any load tending to deform the shank is also resisted by the material of the screw 34. The most important single result of this modified construction in practice is that the additional strength provided makes it possible to reduce the amount of material used in the parts so that a link having a strength equal to that of the construction shown in Figs. 1 to 5 may be produced in a structure having less weight.

The alternate form of construction illustrated in Fig. 7 includes a U-shaped link body similar to that previously described except that the end portion 34 of each of the shanks 12 is not tapered. A slightly modified form of end piece 35 is employed. This end piece is provided with a pair of cylindrical bores which extend only part way through the end piece 35 to form a socket which snugly receives the plain cylindrical portion 34 at the end of each shank 12. An internally threaded longitudinally extending hole 38 is formed in the end of each shank and is engaged by a headed screw 40 which extends through the end piece to draw the shanks into firm engagement with the sockets 36.

Figure 8:
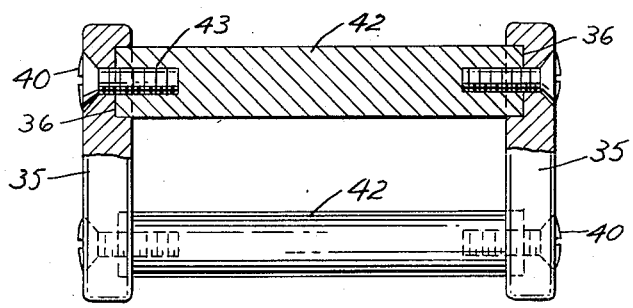
Fig. 8 is a plan view similar to Fig. 7 of another modified type of construction where both end pieces of the link are detachable.

A further modification of the construction is illustrated in Fig. 8 where the shanks of the link are formed by a pair of plain cylindrical bars 42 each having an internally threaded longitudinally extending hole 43 formed in both of its ends. These bars 42 are connected by a pair of identical end pieces 35, the construction of which corresponds to the end piece 35 shown in Fig. 7 and just described.

All the constructions illustrated and described with the exception of the construction of Fig. 8 have been particularly designed for manufacture primarily by forging operations because of the relatively low cost and high quality of the product obtainable by this method of manufacture. The construction shown in Fig. 7 offers further savings in manufacturing cost through the elimination of the tapered mating surfaces at the ends of the shank portions and on the detachable end piece. Further cost decreases result from the construction shown in Fig. 8 through the employment of plain cylindrical bars for the link shanks and identically formed members for the end pieces.

Any variations from the particular constructions illustrated and described are to be considered as part of this invention if embraced within the definitions thereof contained in the following claims.

We claim:

1. A take-apart link for connecting the looped ends of two parachute harness members comprising a pair of substantially parallel shanks adapted to engage said looped ends, an end piece extending between said pair of shanks at each end thereof to connect said shanks in spaced, parallel relation, at least one of said end pieces being detachable and formed with a pair of bores, each dimensioned to receive and engage a portion of one end of each of said pair of shanks, abutment means in said bores to limit the extent of such engagement between said bores and said shanks, said shank end portions each being provided with an internally threaded longitudinally extending hole, and a pair of headed screws each extending through said detachable end piece into engagement with one of said threaded holes to draw said shanks into firm engagement with the bores of said detachable end piece.

2. A take-apart link as set forth in claim 1 wherein both of said end pieces are identical to said detachable end piece and each of said shanks are identical cylindrical members provided with one of said internally threaded longitudinally extending holes at each end thereof.

3. A take-apart link for connecting the looped ends of two parachute harness members comprising a generally U-shaped main link body formed of one-piece construction having a pair of substantially parallel shanks adapted to engage said looped ends and an integral end web interconnecting one end of each of said shanks, said end web being formed with a thickened central portion terminating in a shoulder adjacent to and overlapping the end of each of said shanks of said link body, said shoulder flaring into a flange of reduced thickness projecting beyond the outer circumference of the adjacent portion of each of said shanks and adapted to positively position said harness members thereon, the outer surface of each of said shanks being formed as a cylinder terminating in a tapered portion extending inwardly from the other end thereof, said tapered portion having an end diameter less than the diameter of said cylinder, a detachable end piece adapted to interconnect the other ends of said shanks, said end piece being formed with a pair of tapered bores adapted to engage and relatively position the said tapered portions of said pair of shanks, and means for drawing said end piece into firm, wedged, separable engagement with said link body, said end piece having portions extending beyond the adjacent circumference of said shanks when said link is assembled.

4. A take-apart link as set forth in claim 3 wherein said means for drawing the detachable end piece into firm, wedged, separable engagement with the link body includes a hole formed along the longitudinal center line of said shank portions and extending from the unconnected ends to a point substantially midway of the length thereof and into the area of decreased unit stresses in said shank portions when said link is in service, and a machine element engageable in said hole, said machine element extending to a point adjacent the bottom of said hole when the detachable end piece is connected to the link body thereby.

References Cited in the file of this patent
UNITED STATES PATENTS

| | | |
|---|---|---|
| 262,626 | Smith | Aug. 15, 1882 |
| 2,447,921 | Thomas | Aug. 24, 1948 |